Aug. 8, 1961     H. E. SINGLETON ET AL     2,995,038
PRECISION TORQUE-BALANCE ACCELEROMETER
Filed Feb. 29, 1956     4 Sheets-Sheet 1

HENRY E. SINGLETON
HAROLD F. ERDLEY
INVENTORS

BY Seymour M. Rosenberg
ATTORNEY

Aug. 8, 1961 H. E. SINGLETON ET AL 2,995,038
PRECISION TORQUE-BALANCE ACCELEROMETER
Filed Feb. 29, 1956 4 Sheets-Sheet 2

HENRY E. SINGLETON
HAROLD F. ERDLEY
INVENTORS

BY
Seymour M. Gremley
ATTORNEY

HENRY E. SINGLETON
HAROLD F. ERDLEY
INVENTORS

BY
Seymour M. Rosenberg
ATTORNEY

HENRY E. SINGLETON
HAROLD F. ERDLEY
INVENTORS

BY
Seymour M. Rosenberg
ATTORNEY

United States Patent Office 2,995,038
Patented Aug. 8, 1961

2,995,038
PRECISION TORQUE-BALANCE
ACCELEROMETER
Henry E. Singleton, Downey, and Harold F. Erdley, Los Angeles, Calif., assignors, by mesne assignments, to Litton Industries, Inc., Beverly Hills, Calif., a corporation of Delaware
Filed Feb. 29, 1956, Ser. No. 568,950
9 Claims. (Cl. 73—516)

This invention relates to a precision torque-balance accelerometer, and more particularly, to a precision miniature torque-balance accelerometer which includes a floated pendulum unit having its center of mass lying on the axis of rotation defined by a pair of jewel-and-pivot bearings which guide the floated unit.

In recent years a great amount of effort has been directed toward the development of inertial and celestial autonavigation systems, especially for the guidance of aircraft and missiles. In most of these systems there are employed two or more accelerometers which are mounted on a stabilized platform whose attitude with respect to either earth or inertial space is controlled by associated gyros or celestial instruments, the accelerometers being utilized to generate output signals representative of the acceleration components applied along two or more orthogonal axes of the platform.

The accelerometers developed for use in early autonavigation systems usually included a pendulum unit supported by bearings and free to move in one plane, and means for detecting deviations of the pendulum unit from a null position in the plane in response to accelerations in the plane of movement and normal to the pendulum arm. Although this form of accelerometer is relatively simple in concept, it is inherently limited by the fact that friction in its bearings dulls the sensitivity of the device, and moreover, that for large accelerations the pendulum moves through an arc of sufficient magnitude that the accelerometer output represents unwanted orthogonal accelerations, such as gravity.

This latter disadvantage has been overcome to some extent in the prior art by applying the principle of torque-balance to pendulum actuated accelerometers. According to this technique a counter-torque is applied to the pendulum whenever an acceleration tends to drive the pendulum from its null position, and hence the arcuate movement of the pendulum in its plane of freedom is restricted. Nevertheless, the relatively high frictional torques developed in the accelerometer's bearings have severely limited the sensitivity and hence the utility of even this improved form of accelerometer.

In order to overcome the foregoing difficulties, still another form of instrument, termed an integrating accelerometer, has been developed. These devices produce an output signal representative of velocity in response to applied accelerations, and most commonly utilize an unbalanced single degree of freedom gyro which precesses at a rate proportional to the applied acceleration. Although integrating accelerometers do provide improved sensitivity, they are relatively complex and expensive, and moreover, are of necessity relatively heavy and bulky owing to the fact that the gyro employed therein cannot be minaturized without losing sensitivity, and that servo motors and gear trains must be employed to generate counter-acting precession torques for nulling the gyro.

The present invention, on the other hand, overcomes the above and other disadvantages of the prior art devices by providing a precision torque-balance accelerometer which possesses the high accuracy of integrating accelerometers while nevertheless retaining the inherent simplicity of the torque-balance accelerometers of the prior art. According to the basic concept of the invention, the accelerometer herein disclosed substantially eliminates bearing problems by utilizing a floated pendulum unit having its center of mass lying on the axis of rotation defined by a pair of low friction bearings which guide the floated unit.

More specifically, the precision accelerometer of the invention includes a pendulum unit which in turn comprises a chassis or frame and an associated hollow float member mounted thereon, the pendulum unit being floated within an associated outer housing or case by a suitable liquid and being guided within the housing by a pair of jewel-and-pivot bearings which define a rotational axis passing through the center of mass of the pendulum unit. The configuration of the float and the manner in which it is mounted on the chassis are selected not only to satisfy the foregoing limitation, but also to provide a center of buoyancy which is displaced from the center of mass of the pendulum unit by a predetermined distance normal to the axis of rotation. Consequently, the accelerometer responds only to components of acceleration normal to the common plane of the axis of rotation and center of buoyancy, and owing to the fact that the center of mass of the pendulum unit lies on the rotational axis, these accelerations result in the application of pure rotational torques to the accelerometer and place no load on the accelerometer bearings.

The preferred embodiment of the invention also includes a pair of symmetrically positioned pick-off coils for generating an output error signal representative of rotational torques which tend to drive the pendulum unit from its null position in response to applied accelerations of interest, and a pair of symmetrically disposed torquer coils which are energizable in accordance with the magnitude and sense of the error signal to apply to the pendulum unit a counter torque to maintain the pendulum in substantially its null position. The utilization of a pair of pick-off coils symmetrically located with respect to the rotational axis of the pendulum unit further enhances the accuracy of the accelerometer by eliminating false error signals which might otherwise be created by minute translational movements of the pendulum unit, while the use of a pair of torquer coils permits the application of a purely rotational counter-torque to the pendulum unit, thereby further reducing frictional errors which might otherwise be contributed by the associated pendulum bearings.

Owing to its inherent simplicity the precision accelerometer of the invention may be miniaturized to an unusual degree while nevertheless preserving a threshold sensitivity sufficient to recognize extremely small accelerations, the exceptional sensitivity of the instrument being due to the novel flotation and mounting arrangement of the pendulum unit, as set forth hereinabove.

It is, therefore, an object of the invention to provide a precision torque-balance accelerometer wherein a floated pendulum unit is subjected only to purely rotational torques in response to components of acceleration applied along the sensitive axis of the accelerometer.

Another object of the invention is to provide a precision torque balance accelerometer which includes a floated pendulum unit rotatably guided by a pair of low friction bearings which define a rotational axis passing through the center of mass of the pendulum unit.

A further object of the invention is to provide an extremely sensitive miniaturized accelerometer which operates on the torque-balance principle, the pendulum unit employed therein being floated and being guided by a pair of jewel-and-pivot bearings whose axis passes through the center of mass of the pendulum unit.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

Figure 1:
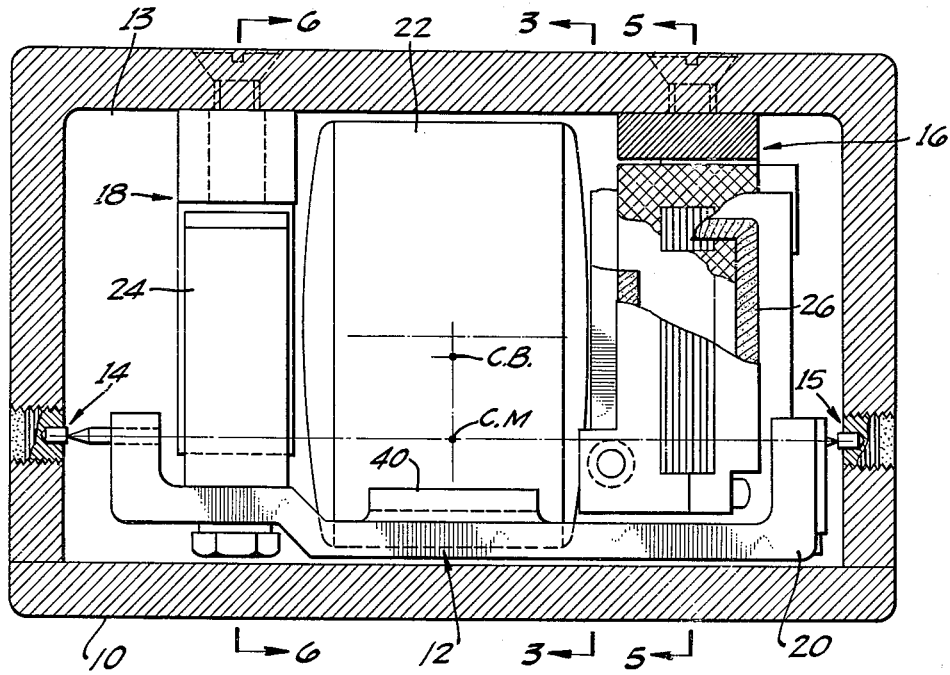
FIG. 1 is a front elevational view, partly in section, of a miniaturized torque-balance accelerometer, according to the invention.

With reference now to the drawings, wherein like or corresponding parts are designated by the same reference characters throughout the several views, there is shown in FIG. 1 a side elevation view of the precision miniature accelerometer of the invention. In its most basic form the accelerometer of the invention comprises an outer housing 10, a pendulum assembly generally designated 12 which is floated in a surrounding fluid 13 and which is rotatably mounted on the ends of the outer housing by a pair of jewel-and-pivot bearings 14 and 15, a pick-off signal assembly, generally designated 16, which function to generate an error signal whenever an applied acceleration disturbs the pendulum assembly from a predetermined null position, and a torquer assembly generally designated 18, which is coupled to the pick-off signal assembly through an external high gain servo amplifier, not shown in FIG. 1, the torquer assembly being responsive to error signals generated by the pick-off assembly for applying a restoring torque to the pendulum unit to maintain the unit in substantially its null position.

In accordance with the basic concept of the invention, the pendulum assembly is so constructed that its center of mass CM lies on the rotational axis defined by jewel-and-pivot bearings 14 and 15, the center of flotation or buoyancy CB being located a predermined distance from the rotational axis of the pendulum and directly above the center of mass. Accordingly, an applied acceleration along the accelerometer's sensitive axis which is perpendicular to the plane of FIG. 1, results in a force being applied to the center of mass of the pendulum unit, the force being equal to the mass of the pendulum unit times the applied acceleration. Since the center of mass lies on the accelerometer's pivot axis, no rotation is produced directly by this force. However, it will be recognized from basic physics that the applied acceleration is also sensed by the center of buoyancy of the pendulum unit, since any acceleration applied to a floated unit creates two forces, one in the vector direction of the acceleration at the center of mass, and one in the diametrically opposite direction acting at the center of buoyancy. This latter force is equal to the volume of fluid displaced times the fluid density times the negative of the applied acceleration. Assuming perfect flotation, the volume of the fluid displaced times the fluid density is equal to the mass of the pendulum unit. Consequently the force acting at the center of buoyancy is equal in magnitude but opposite in direction to the force applied at the center of mass, and creates a pure rotational moment or torque about the rotational axis, and hence the center of mass of the pendulum, with essentially no load being placed on the bearing surfaces to cause undesired frictional torques. The magnitude of the torque, of course, depends not only on the magnitude of the force but also on the distance between the center of mass and the center of buoyancy.

The pendulum assembly comprises a chassis member 20, a substantially cylindrical float 22, a pair of pick-off coils for detecting deviations of the pendulum from its null position, and a pair of torquer coils which cooperate with other frame-mounted elements of the torquer assembly to maintain the pendulum unit in its null position. In the view of FIG. 1 only one torquer coil and only a fragmentary portion of one of the pick-off coils are illustrated, these elements being designated by the reference characters 24 and 26, respectively. It will be appreciated by those skilled in the art that the use of two pick-off coils in lieu of a single coil functions essentially to eliminate false error signals which might otherwise be developed by minute translational movements of the pendulum unit, as opposed to rotational movements. The utilization of two torquer coils, on the other hand, provides in essence a pure rotational restoring torque to the pendulum unit, and consequently further minimizes frictional torques in the bearings.

It should be pointed out that the entire pendulum assembly is preferably constructed of non-magnetic material, the low reluctance magnetic paths required for the pick-off and torquer assemblies being provided by components which are rigidly affixed to outer housing 10. Consequently the pendulum unit is insensitive to extraneous magnetic fields which might otherwise detract from the sensitivity and accuracy of the accelerometer as a whole.

It should be noted that the outer housing of the accelerometer is preferably constructed from a magnetic material, such as cold rolled steel, for example, which effectively shields the internal elements from stray external fields while simultaneously providing a low reluctance magnetic return path for the magnetic fields generated in the pick-off and torquer assemblies. It will be recognized that this latter function of the housing member thereby permits a further reduction in the weight and size of the accelerometer of the invention.

Figure 2:
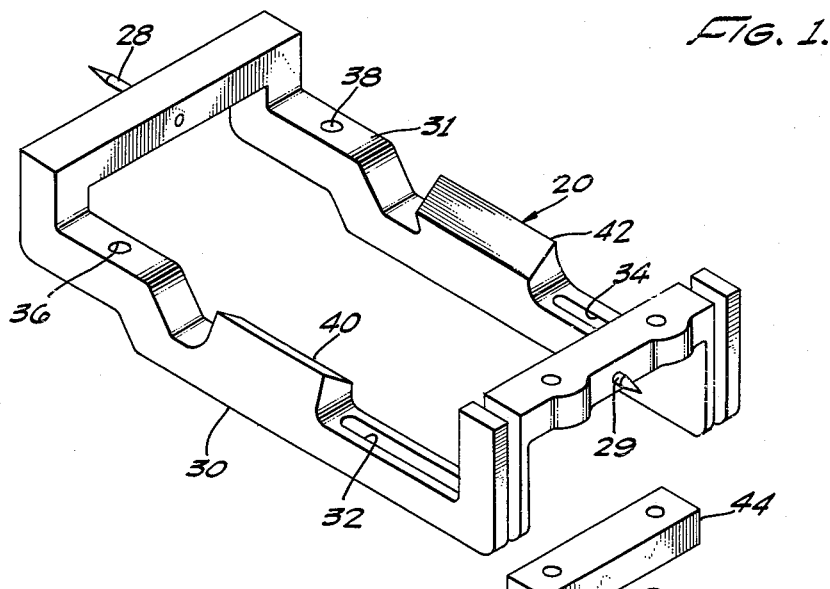
FIG. 2 is an isometric view of the pendulum unit chassis employed in the accelerometer of FIG. 1.
Figure 3:
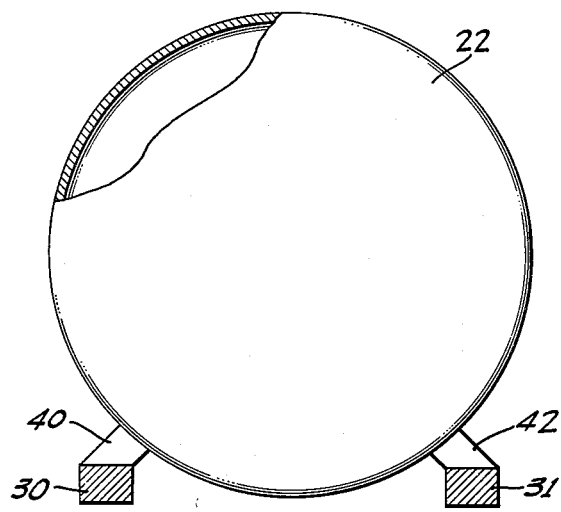
FIG. 3 is a side elevational view, partly in section of the float portion of the pendulum unit employed in the accelerometer of the invention.

Referring now to FIG. 2 there is shown an isometric view of chassis member 20 illustrating the details of its construction and its balanced symmetry with respect to a pair of bearing pivots 28 and 29 mounted in the ends thereof. The chassis is preferably constructed of brass or some other suitable non-magnetic material, and comprises two longitudinal support members 30 and 31 which are employed for mounting the accelerometer float, pick-off coils and torquer coils. More specifically, the longitudinal support members respectively include a pair of slots 32 and 34 in their right hand ends, as viewed in FIG. 2, for mounting the error signal pick-off coils, and are drilled at points 36 and 38 in their opposite ends for mounting the associated torquer coils. In addition the supports respectively include a pair of angled projections 40 and 42 in their central regions for mounting accelerometer float 22, the relationship of the projections with respect to the float being shown in detail in FIG. 3. The float is also constructed of a suitable non-magnetic material such such as aluminum, and may be affixed to projections 40 and 42 by soldering or with a thermosetting resin, for example.

With reference once more to FIG. 2 the float chassis further includes a variable ballast weight 44 which is bolted to the chassis during the final assembly of the accelerometer after having been machined to provide substantially perfect flotation of the pendulum unit, including the pick-off and torquer coils, in the surrounding flotation liquid. It will be appreciated, of course, that the machining of the ballast weight may also be employed to assure substantially perfect balance of the accelerometer as well, or in other words, to assure that the center of flotation of the pendulum unit is in the same vertical plane as the center of mass at the mechanical null position.

Figure 4:
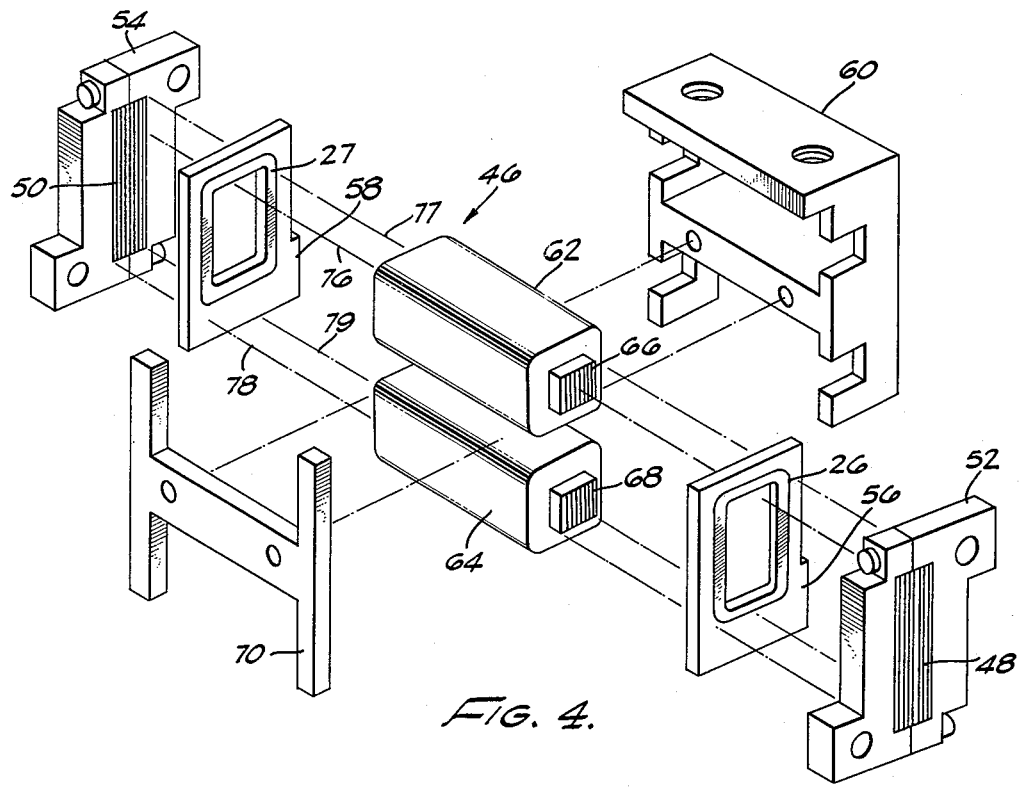
FIG. 4 is an exploded view of the pick-off assembly utilized in the accelerometer of FIG. 1.
Figure 5:
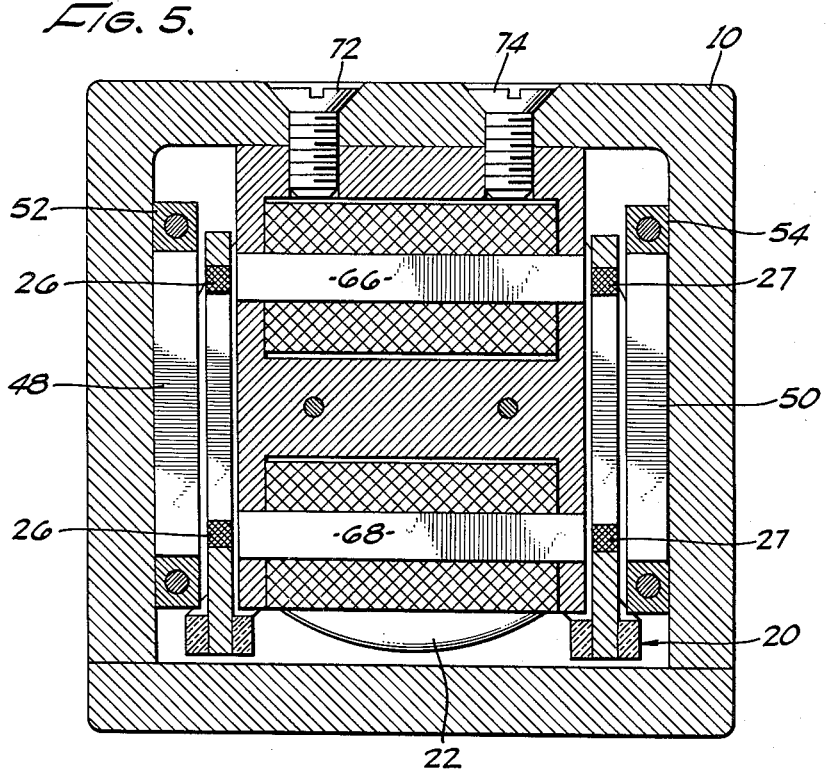
FIG. 5 is a sectional view of the pick-off assembly illustrating the positional relationship of its elements within the accelerometer.

Referring now to FIGS. 4 and 5, there are shown respectively an exploded view of the various elements which constitute the pick-off signal assembly, and a cross-sectional view of these elements as they are positioned within the accelerometer. As shown in FIG. 4 with particularity, the pick-off assembly includes a pick-off excitation coil assembly, generally designated 46, a pair of pick-off return pole pieces 48 and 50 mounted within a pair of associated non-magnetic brackets 52 and 54, and a pair of pick-off coils 26 and 27 which are affixed within a pair of associated non-magnetic mounting brackets 56 and 58, these latter brackets in turn being mounted, during the assembly operation, in the slots 32 and 34 in the float chassis of FIG. 2.

As shown in FIG. 4, pick-off excitation coil assembly 46 includes a non-magnetic mounting bracket 60 for receiving a pair of pick-off excitation coils 62 and 64 which are wound on a pair of magnetic cores 66 and 68, the excitation coils being firmly held within bracket 60 by a non-magnetic clamp 70 which bolts to mounting bracket 60. Referring now to FIG. 5, the pick-off excitation coil assembly is affixed to the top of outer housing 10 in a laterally symmetrical position by a pair of screws 72 and 74, the pick-off return pole pieces 48 and 50 being mounted on the sides of housing 10 through their associated brackets 52 and 54. It should be noted that return pole pieces 48 and 50, as well as magnetic cores 66 and 68, are preferably constructed from laminates of high $\mu$ grain-oriented steel.

In addition it should be pointed out that for maximum null sensitivity, the position of the cores with respect to the return pole pieces should be such that the longitudinal surfaces of the cores lie in common planes with the ends and sides of the return pole pieces, as diagrammatically illustrated in FIG. 4 by the lines 76, 77, 78 and 79 which define the intersections of these planes. Fig. 5, on the other hand, depicts the positional relationship of pick-off coils 26 and 27 with respect to the above-described magnetic circuit elements when the accelerometer is in its null position, the upper and lower horizontal portions of each pickup coil being so positioned that each portion is subject to the identical magnetic field, both in magnitude and gradient.

Consider now the operation of the pick-off coil assembly first when the accelerometer is in its quiescent or null position, and secondly when it is subjected to an acceleration along its sensitive axis. Pick-off excitation coils 62 and 64 are connected either serially or in parallel and are excited from a common alternating current source operating at a preselected frequency, such as five kilocycles, for example. The excitation coils are poled in opposition to each other so that the magnetic flux path is through one of cores 66 and 68, into return pole piece 48, back into the other core, then into return pole piece 50, and then back into the first core.

The two pick-off coils 26 and 27, on the other hand, are interconnected with series aiding polarity with respect to each other. Recalling now that in the null position of the accelerometer the top and bottom of each pick-off coil are subjected to identical magnetic field patterns, it will be recognized that the net flux linking each turn of each pick-off coil is zero at the null position. Consequently neither pick-off coil will generate an electrical output signal.

Before proceeding with the operation of the pickoff coil in response to an acceleration along the accelerometer's sensitive axis, consider first the response of the pick-off coils in response to a minute translational movement of the pendulum unit. Clearly, if both pick-off coils are moved an identical amount in a translational movement as opposed to a rotational movement, each pick-off coil will have induced therein an alternating current error signal corresponding to the magnitude of the disturbance from the null position. However, the error signals will be 180° out of phase with respect to each other and, if it is assumed that their magnitudes are equal because of identical movement of the coils, the two error signals will produce a net output electromotive force of zero, indicating that no acceleration of interest has been detected.

Assuming now that an acceleration is applied to the accelerometer along its sensitive axis, the pendulum unit therewithin will tend to rotate about its center of mass, and with reference to FIG. 5, will tend to raise one of the pick-off coils with respect to its null position and to lower the other pick-off coil, thereby producing a net flux of predetermined magnitude in each of the two pick-off coils. This then will function to induce in the pick-off coils error signals which are in phase and which will effectively produce a net output error signal of substantially twice the magnitude of the individual error signals generated by the individual pick-off coils per se. The angular displacement of the pick-off is represented by the amplitude of the output signal, whereas the sense of the acceleration, or in other words whether it is positive or negative, is indicated by the phase of the output error signal with respect to the reference signal utilized to excite the pick-off assembly.

The phrase "tend" is employed hereinabove in describing the response of the pendulum unit to an acceleration of interest because the pendulum unit never does depart from its null position by more than a relatively small rotational distance owing to the fact that the pick-off error signal is utilized continuously to restore the pendulum to its null position through energization of the accelerometer torquer assembly through an external high gain servo amplifier which responds to the pick-off signal. It is extremely important that the accelerometer have a relatively tight servo loop and respond in this fashion, since otherwise the center of buoyancy and the center of mass of the pendulum unit would no longer lie in the same vertical plane, and consequently, an orthogonal acceleration in the vertical direction could create an erroneous pick-off signal ostensibly indicative of an acceleration along the sensitive axis of the accelerometer.

The electrical conductors interconnecting the pick-off excitation coils from the external alternating current source may be brought out directly through the outer housing of the accelerometer in any suitable manner. However, the electrical conductors interconnecting the pendulum unit pick-off coils with the input circuit of the associated servo amplifier must not mechanically intercouple the pendulum unit with the outer housing member, or in other words, should not be permitted to exert any spring forces on the pendulum unit since such forces would detract from the sensitivity and accuracy of the instrument. Although not specifically shown in the drawings, the electrical connections to the pick-off coils are preferably made through a pair of relatively fine wires which are also relatively long, one end of each wire being connected to the pick-off coils while the other end is connected to an insulated terminal in the outer housing of the accelerometer at a point remote from the pick-off coil assembly. Since numerous techniques and wire types for providing essential "no-torque" connections are well known to the precision instrument art, further description of these interconnections is considered unnecessary.

Figure 6:
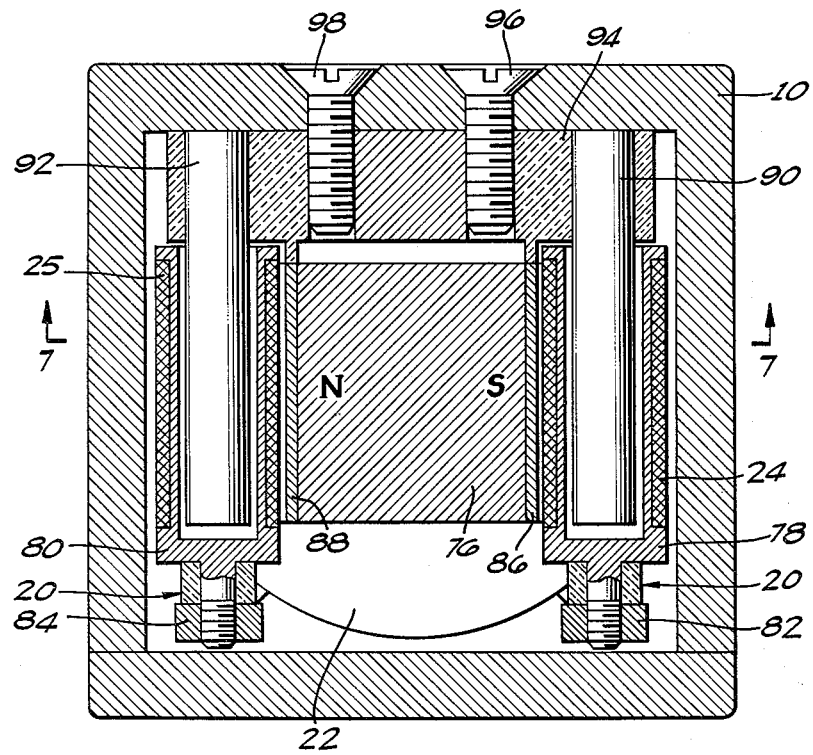
FIGS. 6 and 7 are cross-sectional views of the torquer assembly incorporated in the accelerometer of FIG. 1.

Recall now from the description of FIG. 1 that the torque assembly employed in the precision accelerometer of the invention preferably includes a pair of torquer coils so as to provide a pure rotational restoring moment to the accelerometer's pendulum unit whenever a null disturbing acceleration is detected. With reference now to FIG. 6 there is shown a cross-sectional view of torquer assembly 18 in FIG. 1, the basic elements of the torquer assembly including a pair of torquer coils 24 and 25, a magnet 76 preferably fabricated from Curie point shunt compensated Alnico V, and a low reluctance magnetic return path for concentrating the magnetic flux from magnet 76 in the region of the torquer coils.

More specifically, torquer coils 24 and 25 are mounted on a pair of non-magnetic and hollow bobbins 78 and 80 which in turn are affixed to the longitudinal supports of pendulum chassis 20 by a pair of nuts 82 and 84. Bobbins 78 and 80 and their corresponding torque coils are thereby positioned adjacent a pair of high permeability pole pieces 86 and 88 which terminate at the poles of magnet 76, these pole pieces constituting a portion of the low reluctance return path for magnet 76. The remainder of the return path is constituted by the upper portion of outer housing 10 and by a pair of soft iron studs 90 and 92 which project into the hollow torquer bobbins over the length and terminate adjacent the lower end of the torquer coils, the upper ends of the studs being held against housing 10 by a brass mounting bracket 94 which is affixed to housing 10 by a pair of screws 96 and 98. As shown in FIG. 6 this bracket also supports pole pieces 86 and 88 and hence magnet 76; consequently the magnetic circuit of the torquer assembly is from the north pole of magnet 76, through pole piece 88 and across its associated gap to stud 92, through the top of housing 10 back into stud 90, and then through the associated gap back to the south pole of magnet 76 through pole piece 86.

Figure 7:
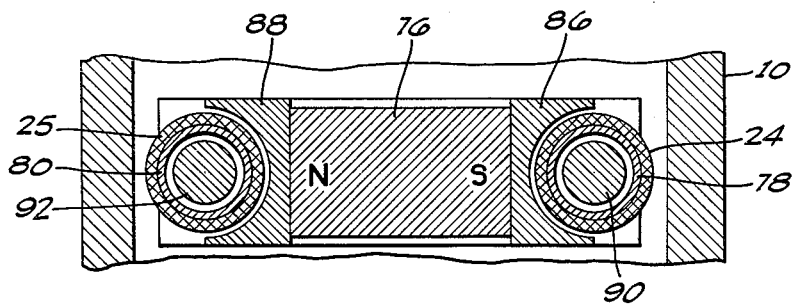

With reference now to FIG. 7 which is a cross-sectional view of the torquer assembly taken along section line 7—7 in FIG. 6, pole pieces 86 and 88 are preferably machined to provide semi-cylindrical surfaces adjacent which torquer coils 26 and 27 are disposed, substantially all of the magnetic flux produced by magnet 76 linking the torquer coils. It should be pointed out that in constructing the magnetic circuit of the torquer assembly the machining of pole pieces 86 and 88 and of mounting bracket 94 is preferably undertaken after first assembling as an integral unit the magnet and the metallic blocks from which the pole pieces and mounting bracket are to be machined. It should also be pointed out that the input conductors to the torquer coils from the associated servo amplifier should comprise flex wires which are brought out through the housing member at points remote from the torquer coils, in the same manner as specified hereinabove with respect to the description of the pick-off assembly.

As stated previously hereinabove with respect to the description of FIG. 1, the entire pendulum unit including chassis, float, pick-off coils and torquer coils are surrounded by a flotation fluid 13 which serves to float the unit so that the jewel-and-pivot bearings are effectively only guiding devices and are not loaded by the mass of the pendulum unit. The limitations on the selection of the flotation fluid for miniaturized accelerometer are that it be relatively inert, that it be sufficiently dense to permit flotation of the pendulum unit with a relatively small float, and that its viscosity be relatively small to provide the desired damping for a relatively low mass large area pendulum unit. One of several known flotation fluids which may be employed in the accelerometer is sold under the tradename of Flurolube FS by the Hooker Electrochemical Co., of Niagara Falls, New York, this substance having a density of 1.86 grams per cubic centimeter and a viscosity of 5 centistokes.

Figure 8:
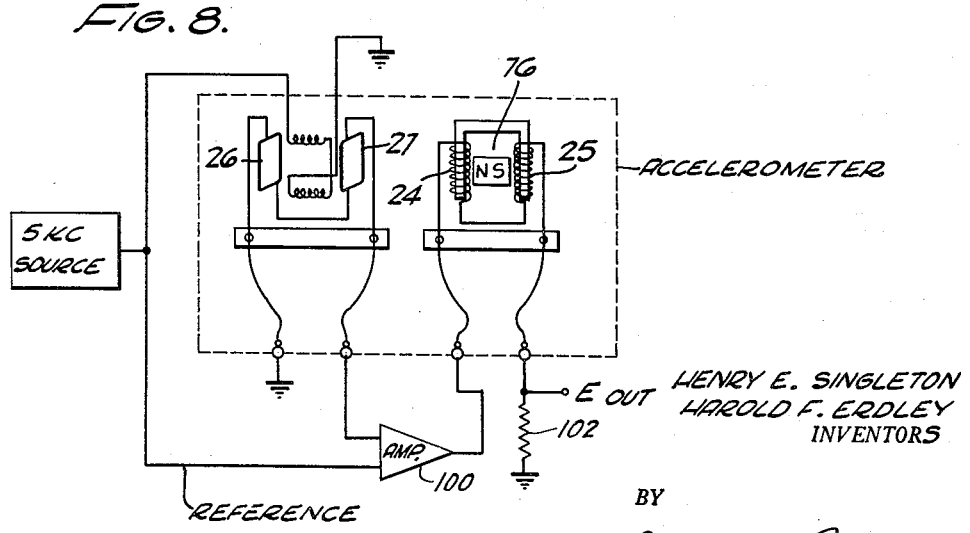
FIG. 8 is a block diagram, partly in schematic form illustrating the manner in which the torquer assembly is servoed from the error signals.

With reference now to FIG. 8, in operation torquer coils 24 and 25 are energized by a direct current electrical signal from servo amplifier 100 whenever a rotational disturbance from the accelerometer's null position is detected by pick-off coils 26 and 27, the magnitude of the signal applied being determined by the magnitude of the error signal induced in the pick-off coils while the polarity of the restoring signal is determined by the phase of the error signal with respect to the 5 kilocycle reference signal. Consequently the torquer current may be employed as a measure or indication of the acceleration being applied to the accelerometer along its sensitive axis.

It will be recognized that numerous electrical techniques may be employed for providing an accelerometer output signal representative of the applied acceleration. For example, if it were desired to produce an analog output signal whose voltage is proportional to acceleration, a precision resistor, such as resistor 102 in FIG. 8, may be inserted in series with the coils to provide the desired signal. If on the other hand a digital output signal is preferred, an analog-to-digital converter of the type described in copending U.S. patent application Serial No. 540,699 filed on October 17, 1955, by Siegfried Hansen for "Analog-to-Difunction Converters" which issued as U.S. Patent No. 2,885,662 on May 5, 1959, could be utilized in conjunction with the precision accelerometer of the invention.

It will be recognized by those skilled in the art that the design of the servo amplifier employed with the accelerometer of the invention is determined by a number of parameters, such as, for example, the mass of the pendulum unit, the damping to which it is subjected, the null sensitivity and speed of response desired, the maximum acceleration to which the accelerometer will be subjected, and the maximum permissible deviation from the mechanical null position in response to a full scale step-function acceleration. It will also be recognized that the amplifier may incorporate a lead network if desired in a specific systems application, and may comprise either vacuum tubes or transistors, the latter having been found especially suitable for use with miniaturized accelerometers constructed in accordance with the teachings herein disclosed.

The specifications tabulated below are set forth to illustrate the remarkable sensitivity concomitant with small size which may be achieved with the precision accelerometer of the invention:

| | |
|---|---|
| Volume | 3 cubic inches. |
| Weight | 9 ounces. |
| Length | 2 inches. |
| Width | 1.25 inches. |
| Height | 1.25 inches. |
| Maximum acceleration | 10 $g$'s. |
| Threshold acceleration | $.5 \times 10^{-5}$ $g$'s. |
| Maximum bias error | $.5 \times 10^{-4}$ $g$'s. |
| Scale factor error | $10^{-4}$ $g$'s up to 1 $g$. |
| Scale factor error | $10^{-3}$ $g$'s from 1 $g$ to 5 $g$'s. |

In actual practice the threshold sensitivity of the accelerometer is usually much greater than the figure given above for the static case, since the residual noise present in any system in which the accelerometer is used will act as a natural dither, continuously driving the pendulum unit through the frictional dead zone of its bearings at relatively high frequencies.

Summarizing the invention, there has been disclosed a precision torque-balance type of accelerometer which responds to extremely small accelerations while nevertheless permitting the ultimate in miniaturization, these advantages being provided through the utilization of a floated pendulum unit mounted on jewel-and-pivot bearings and having its center of mass on its axis of rotation. It is to be expressly understood, of course, that these features may be incorporated in structures different from the specific structure shown and described, and that numerous modifications and alterations may be made in the details of the accelerometer herein disclosed without departing from the spirit or scope of the invention. For example, a compensating bellows unit may be incorporated in the wall of the accelerometer housing to compensate for volumetric differentials of the flotation liquid created by temperature variations. Accordingly the invention is to be limited only by the spirit and scope of the appended claims.

What is claimed as new is:

1. In a precision torque-balance accelerometer, the combination comprising: a floated pendulum unit having a center of mass and a center of buoyancy displaced from each other by a predetermined distance, said pendulum unit comprising a chassis member and a hollow float member mounted on said chassis; a housing for containing said floated pendulum unit; and a pair of bearings for rotatably mounting said chassis to said housing on a predetermined axis, said axis passing through the center of mass of said pendulum unit and being displaced from said center of buoyancy by said predetermined distance.

2. The combination defined in claim 1 wherein said bearings comprise jewel-and-pivot bearings.

3. In a precision torque-balance accelerometer, the combination comprising: a pendulum unit including a hollow float member, an outer housing member for containing said pendulum unit; a pair of jewel-and-pivot bearings for rotatably mounting said pendulum unit in said outer housing member, the rotational axis defined by said bearings passing through the center of mass of said pendulum unit; and a flotation fluid surrounding said pendulum unit, the weight of the fluid displaced by said pendulum unit being substantially equal to the weight of said pendulum unit, the center of buoyancy of said pendulum unit being displaced from said rotational axis by a predetermined distance.

4. The accelerometer defined in claim 3 wherein the center of mass and the center of buoyancy of said pendulum unit lie in a common plane perpendicular to said rotational axis.

5. A precision torgue-balance accelerometer comprising: a pendulum unit including a hollow float member; an outer housing member for containing said pendulum unit; a pair of jewel-and-pivot bearings for rotatably mounting said pendulum unit in said outer housing member, the rotational axis defined by said bearings passing through the center of mass of said pendulum unit; a flotation fluid surrounding said pendulum unit, the weight of the fluid displaced by said pendulum unit being substantially equal to the weight of said pendulum unit, the center of mass of the fluid displaced by said pendulum unit being displaced from said rotational axis by a predetermined distance; first means coupled to said pendulum unit for generating an electrical error signal proportional to the rotational torque applied to said pendulum unit whenever a component of acceleration is applied to the accelerometer perpendicular to the common plane of said rotational axis and the center of mass of the displaced fluid; and second means coupled to said pendulum unit and responsive to said error signal for applying an equal and opposite counter torque to said pendulum unit to maintain said pendulum unit in substantially its null position.

6. The accelerometer defined in claim 5 wherein said first means includes an excitation coil assembly affixed to the interior of said housing member and a pair of pick-off coils positioned contiguous with said excitation coil assembly, said pick-off coils constituting part of said pendulum unit and being disposed symmetrically with respect to said common plane whereby said accelerometer is insensitive to translational movements of said pendulum unit.

7. The accelerometer defined in claim 6 wherein said second means includes a pair of torquer coils symmetrically disposed with respect to said common plane, and magnetic means connected to the interior of said housing member and positioned adjacent said torquer coils, said torquer coils constituting part of said pendulum unit and being electrically energizable to co-act with said magnetic means to provide said counter torque to said pendulum unit.

8. A precision torque-balance accelerometer comprising: a pendulum unit including a chassis member having first and second ends and a hollow float member mounted substantially in the center of said chassis; an outer housing member for containing said pendulum unit; a pair of bearings for rotatably intercoupling said first and second ends of said chassis member to the walls of said housing member, the axis of rotation defined by said bearings passing through the center of mass of said pendulum unit; a flotation fluid filling said housing member, the mass of said pendulum unit being substantially equal to the mass of said fluid displaced by said pendulum unit whereby said bearings function primarily as guides, the center of mass of the fluid displaced by said pendulum unit being displaced from the center of mass of said pendulum unit by a predetermined distance, the reference line between said centers of mass being normal to said rotational axis defined by said bearings; signal pick-off means coupled to said pendulum unit for generating an electrical error signal proportional to the rotational torque applied to said pendulum unit in response to the application thereto of an acceleration component perpendicular to said reference line and said rotational axis; and torquer means coupled to said pendulum unit and responsive to error signals generated by said pick-off means for applying to said pendulum unit a restoring counter torque equal and opposite to said rotational torque.

9. The precision torque-balance accelerometer defined in claim 8 wherein said bearings comprise a pair of jewels mounted in opposing walls of said housing member and a pair of associated pivots mounted in said first and second ends of said chassis, respectively, each of said pivots being seated in its associated jewel.

References Cited in the file of this patent

UNITED STATES PATENTS

| | | |
|---|---|---|
| 2,020,905 | Robert | Nov. 12, 1935 |
| 2,041,072 | Kollsman | May 19, 1936 |
| 2,192,148 | Otto | Feb. 27, 1940 |
| 2,193,707 | Baumann | Mar. 12, 1940 |
| 2,498,118 | Weiss | Feb. 21, 1950 |
| 2,590,184 | Koulomizine | Mar. 25, 1952 |
| 2,697,594 | Stanton | Dec. 21, 1954 |
| 2,778,624 | Statham | Jan. 22, 1957 |
| 2,801,097 | Adamson | July 30, 1957 |